United States Patent
Zaima et al.

(10) Patent No.: US 12,475,930 B1
(45) Date of Patent: Nov. 18, 2025

(54) MAGNETIC RECORDING DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Shino Zaima, Yokohama Kanagawa (JP); Koji Sonoda, Yokohama Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/983,877

(22) Filed: Dec. 17, 2024

(30) Foreign Application Priority Data

Aug. 2, 2024 (JP) .................................. 2024-127809

(51) Int. Cl.
*G11B 5/00* (2006.01)
*G01N 21/88* (2006.01)
*G01N 21/898* (2006.01)
*G11B 5/702* (2006.01)
*G11B 27/36* (2006.01)

(52) U.S. Cl.
CPC ......... *G11B 27/36* (2013.01); *G01N 21/8806* (2013.01); *G01N 21/898* (2013.01); *G11B 5/7026* (2013.01)

(58) Field of Classification Search
CPC ... G11B 5/00; G11B 27/36; G11B 2005/0021; G11B 5/09; G11B 5/54; G11B 5/58

USPC .......................................................... 360/48
See application file for complete search history.

(56) References Cited

U.S. PATENT DOCUMENTS

| | | | |
|---|---|---|---|
| 7,099,097 B2 | 8/2006 | Hamaguchi et al. | |
| 8,018,585 B2* | 9/2011 | Hariyama .......... | G01B 11/0608 |
| | | | 356/239.3 |
| 9,916,847 B1 | 3/2018 | Granz et al. | |
| 9,922,676 B1 | 3/2018 | Schreck et al. | |
| 10,614,850 B1 | 4/2020 | Jones et al. | |
| 10,950,267 B1 | 3/2021 | Aoki et al. | |

FOREIGN PATENT DOCUMENTS

| | | |
|---|---|---|
| JP | 2006-155708 A | 6/2006 |
| JP | 2022-547350 A | 11/2022 |
| WO | WO 2021/173170 A1 | 9/2021 |

\* cited by examiner

*Primary Examiner* — Nabil Z Hindi
(74) *Attorney, Agent, or Firm* — Knobbe, Martens, Olson & Bear, LLP

(57) ABSTRACT

According to one embodiment, a magnetic recording device includes a recording medium, a magnetic head including a light source, a light emitting element, and a sensor, and a controller including an inspection circuit which detects a height of a defect of the recoding medium based on output of the sensor, a memory recording the height of the defect, and a setting circuit which sets an upstream side record/reproduce prohibited sector on an upstream side of the defect, in a travel direction of the magnetic head, on a track of the recording medium on which the defect is present, and which sets a downstream side record/reproduce prohibited sector longer in track direction than the upstream side record/reproduce prohibited sector on a downstream side of the defect.

5 Claims, 10 Drawing Sheets

F.I.G. 1

MAGNETIC RECORDING DEVICE

CROSS-REFERENCE TO RELATED APPLICATIONS

This application is based upon and claims the benefit of priority from Japanese Patent Application No. 2024-127809, filed Aug. 2, 2024, the entire contents of which are incorporated herein by reference.

FIELD

Embodiments described herein relate generally to a magnetic recording device.

BACKGROUND

A magnetic recording device using a magnetic head of heat assisted magnetic recording (HAMR) method has been proposed as a magnetic recording device. HAMR is a technology of increasing the recording capacity by heating a recording medium with a laser during recording.

In HAMR, due to the rise in temperature of the recording medium, a product composed of components present on the recording medium adheres between a light emitting element of the magnetic head and the recording medium to form a cured material (hereafter referred to as "build-up"). This cured material functions as a layer that increases the thermal conductivity efficiency of the laser beam. As a result, it is possible to increase the temperature of the recording medium without increasing the laser output.

In contrast, defects that occur during the process of manufacturing the recording medium, for example, minute scratches, and defects caused by sputter flakes and the like, for example, micro protrusions (bumps) having a height of approximately 1 to 8 nm, are present on the recording surface of the recording medium. For this reason, when the magnetic head travels over the recording surface with a minute gap, the built-up cured material may collide with defects such as minute protrusions and may be scraped off. Immediately after the cured material is scraped off, the thermal conductivity efficiency of the laser beam may decrease, and the magnetic recording quality may decrease.

DETAILED DESCRIPTION

Figure 1:
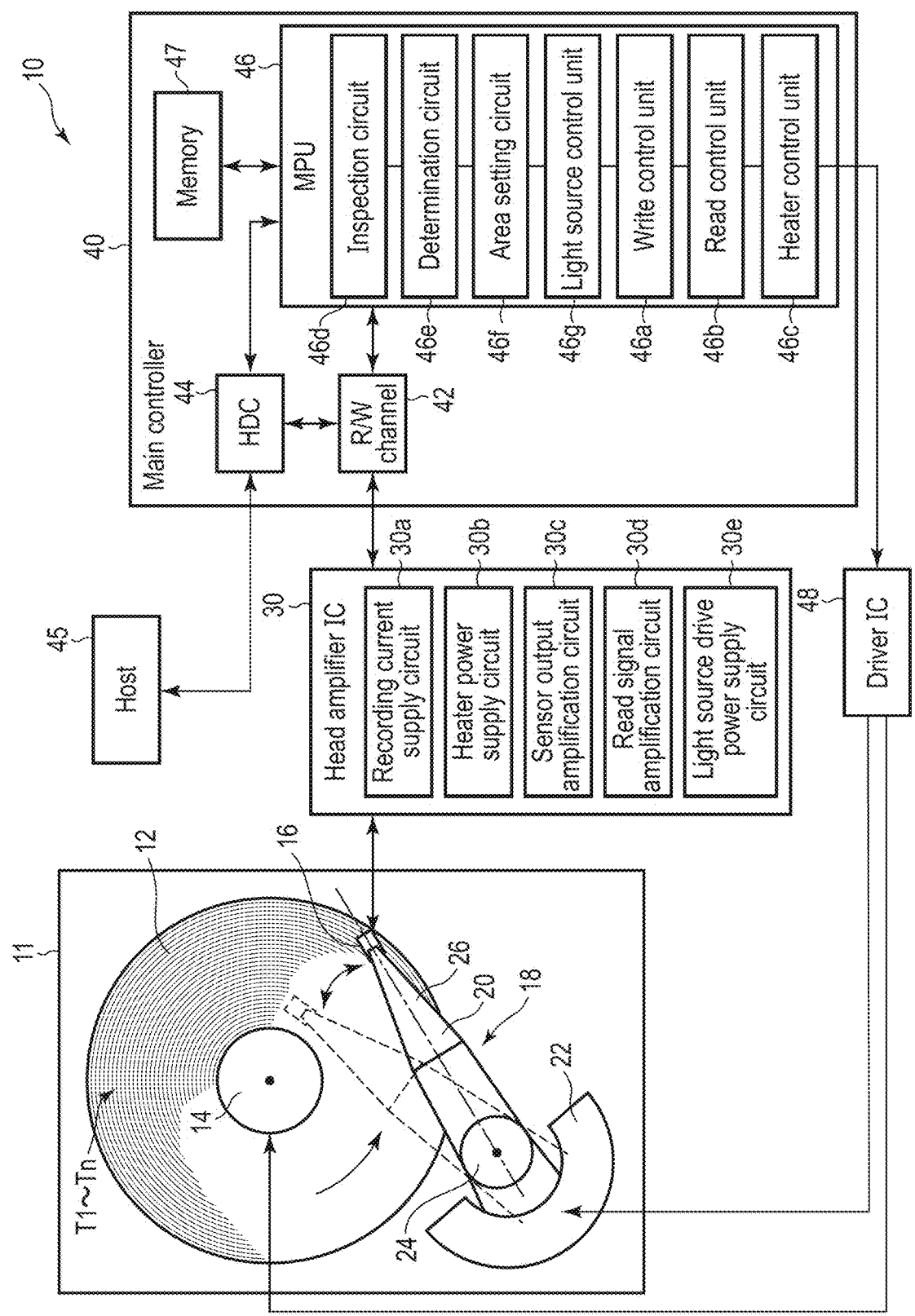
FIG. 1 is a block diagram schematically showing a hard disk drive (HDD) according to a first embodiment.

Various embodiments will be described hereinafter with reference to the accompanying drawings. In general, according to one embodiment, a magnetic recording device comprises a disk-shaped recording medium; a magnetic head including a recording element, a light source, a light emitting element emitting light onto a recording surface of the recording medium, and a sensor which detects a defect on the recording surface of the recording medium; and a controller including an inspection circuit which detects a height of the defect on the recording surface of the recording medium based on output of the sensor, a memory which records the detected height of the defect, a setting circuit which sets an upstream side record/reproduce prohibited sector on an upstream side of the defect, in a travel direction of the magnetic head, on a track of the recording medium on which the defect is present, and which sets a downstream side record/reproduce prohibited sector longer in track direction than the upstream side record/reproduce prohibited sector on a downstream side of the defect, and a light source control circuit controlling output of the light source.

The disclosure is merely an example, and proper changes in keeping with the spirit of the invention, which are easily conceivable by a person with ordinary skill in the art, come within the scope of the invention as a matter of course. In addition, in some cases, in order to make the description clearer, the widths, thicknesses, shapes and the like, of the respective parts are schematically illustrated in the drawings, compared to the actual modes. However, the schematic illustration is merely an example, and adds no restriction to the interpretation of the invention. Besides, in the specification and drawings, the same elements as those described in connection with preceding drawings are denoted by like reference numbers, and a detailed description thereof is omitted or simplified unless necessary.

First Embodiment

Figure 2:
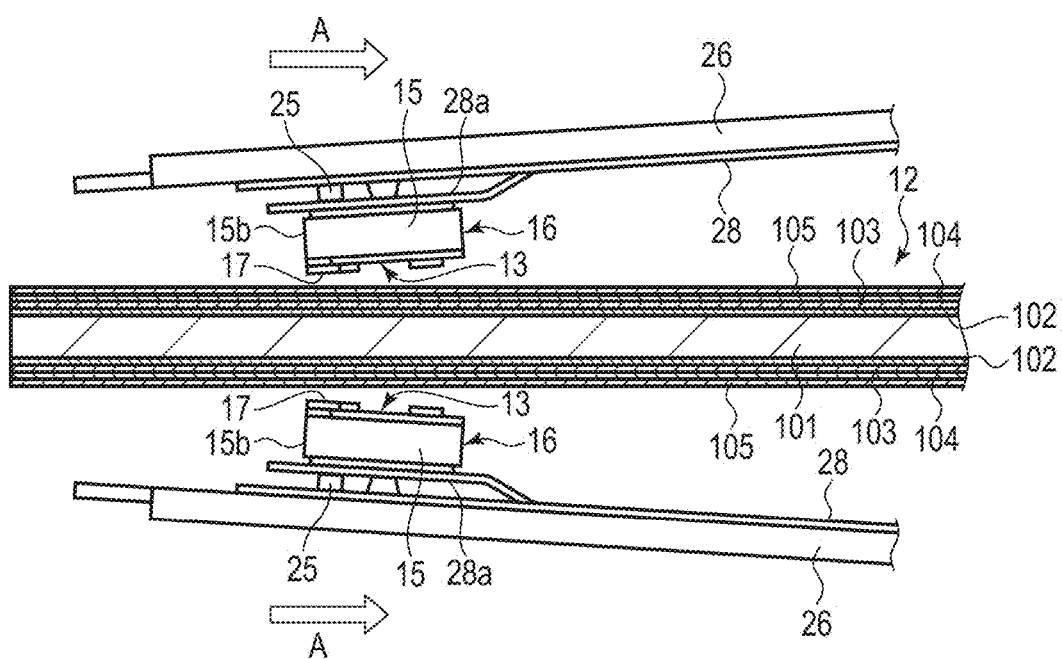
FIG. 2 is a side view schematically showing a magnetic head, a suspension, and a magnetic disk in the HDD.

A hard disk drive (HDD) according to a first embodiment will be described in detail as an example of a magnetic recording device. FIG. 1 is a block diagram schematically showing the HDD according to the first embodiment, and FIG. 2 is a side view showing a magnetic head in a flying state and a magnetic disk.

As shown in FIG. 1, the HDD 10 comprises a rectangular housing 11, a magnetic disk 12 serving as a recording medium arranged in the housing 11, a spindle motor 14 which supports and rotates the magnetic disk 12, and a plurality of magnetic heads 16 which performs recording (write) and reproduction (read) of data to and from the magnetic disk 12. The HDD 10 comprises a head actuator 18 which moves the magnetic heads 16 onto any track on the magnetic disk 12 and which positions the magnetic heads 16. The head actuator 18 includes a carriage assembly 20 which supports the magnetic heads 16 such that the magnetic heads 16 are movable, and a voice coil motor (VCM) 22 which rotates the carriage assembly 20.

The HDD 10 includes a controller which includes a head amplifier IC 30 driving the magnetic heads 16, a main controller 40, and a driver IC 48. The head amplifier IC 30 is, for example, provided at the carriage assembly 20 and is electrically connected to the magnetic heads 16. The head amplifier IC 30 includes a recording current supply circuit (recording current supply unit) 30a that supplies a recording current to recording coils of the magnetic heads 16, a heater power supply circuit 30b that supplies drive power to thermal actuators (heaters) of the magnetic heads 16 to be described below, a sensor output amplification circuit 30c that amplifies a detection signal of a thermal resistance sensor HR, a read signal amplification circuit 30d that amplifies the signals read by the magnetic heads 16, a light source drive power supply circuit 30e that supplies drive power to a laser oscillator to be described below, for example, a laser diode unit (LDU), and the like.

The main controller 40 and the driver IC 48 are constituted on a control circuit board (not shown) provided on a back surface side of the housing 11. The main controller 40 comprises a read/write channel (R/W channel) 42, a hard disk controller (HDC) 44, a microprocessor (MPU) 46, a memory 47, and the like. The main controller 40 is electrically connected to the magnetic head 16 via the head amplifier IC 30. The main controller 40 is electrically connected to the VCM 22 and the spindle motor 14 via the driver IC 48. The HDC 44 can be connected to a host computer 45.

In the main controller 40, the MPU 46 includes a write control unit 46a that controls the write head, a read control unit 46b that controls the read head, a heater control unit 46c that controls the power supplied to the thermal actuator, an inspection circuit 46d, a determination circuit 46e, an area setting circuit 46f that sets prohibited areas, a light source control unit 46g that controls the drive of the light source, and the like. As described later, the inspection circuit 46d inspects the presence or absence and the size of minute protrusions (bumps) on the surface of the magnetic disk 12, based on the sensor output of the magnetic heads 16. Various data such as the heights and widths of the bumps, which are the inspection results, recording-prohibited tracks, recording-prohibited sectors, and heater power setting values are stored in the memory 47.

As shown in FIG. 1 and FIG. 2, the magnetic disk 12 is constructed as a perpendicular magnetic recording medium. The magnetic disk 12 includes a substrate 101 formed of a non-magnetic material shaped in a disk. A heat sink layer 102, a crystal orientation layer 103, a magnetic recording layer 104 having magnetic anisotropy in a direction orthogonal to the surface of the magnetic disk 12, and a protective layer 105 having a lubricant applied to its surface are sequentially stacked on top and bottom surface of the substrate 101. The crystal orientation layer 103 is provided to improve the orientation of the magnetic recording layer 104. The heat sink layer 102 is arranged under the crystal orientation layer 103 to suppress the spread of the heated area. Incidentally, the magnetic disk 12 contains Si-based materials such as SiOx.

The HDD 10 comprises a plurality of, for example, ten magnetic disks 12. The plurality of magnetic disks 12 are fitted coaxially with each other, on the hub of the spindle motor 14. The magnetic disks 12 are rotated at a predetermined rate in a direction of an arrow, by the spindle motor 14.

As shown in FIG. 1, a number of concentric recording tracks T1 to Tn are formed on each surface (magnetic recording layer) of the magnetic disk 12. Each of the recording tracks T1 to Tn includes a plurality of sectors arranged in a circumferential direction.

The carriage assembly 20 includes a bearing section 24 that is supported in the housing 11 so as to be rotatable, and a plurality of arms and suspensions 26 that extend from the bearing section 24. As shown in FIG. 2, the magnetic head 16 is supported on an extending end of each of the suspensions 26. The magnetic head 16 is electrically connected to the head amplifier IC 30 via a wiring member (flexure) 28 provided on the carriage assembly 20.

As shown in FIG. 2, the magnetic head 16 is configured as a flying head and includes a slider 15 formed in a shape of a substantially rectangular parallelepiped and a head section 17 formed at an end portion on a side of an outflow end (trailing end) 15b of the slider 15. The slider 15 is formed of, for example, a sintered body of alumina and titanium carbide (AlTiC), and the head section 17 is formed of thin films of a plurality of layers. The slider 15 is attached to a gimbal portion 28a of the wiring member 28.

The slider 15 has a disk opposing surface (air bearing surface (ABS)) 13 in a substantially rectangular shape, which faces the surface of the magnetic disk 12, as well as a back surface attached to the gimbal unit 28a. A laser oscillator that functions as a light source, for example, a laser diode unit (LDU) 25, is fixed to the back surface of the slider 15. The slider 15 is maintained in a state of flying at a predetermined distance from the surface of the magnetic disk 12, by an air flow generated between the disk surface and the ABS 13 by the rotation of the magnetic disk 12. As the magnetic disk 12 rotates, the magnetic head 16 travels in a direction of arrow A (head travel direction) with respect to the magnetic disk 12, i.e., in a direction opposite to the disk rotation direction.

Figure 3:
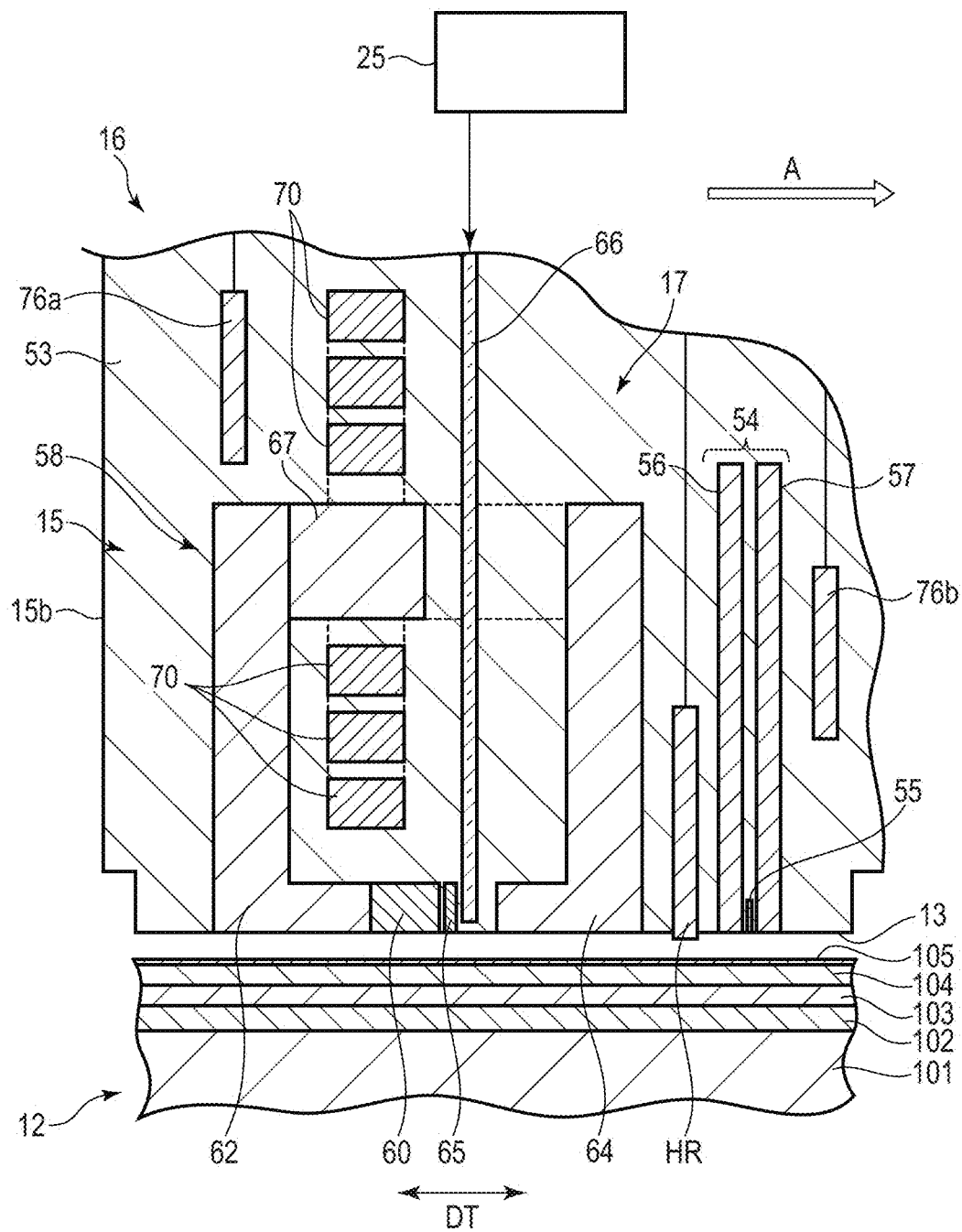
FIG. 3 is an expanded sectional view showing a head portion of the magnetic head.

FIG. 3 is an expanded sectional view showing the magnetic head 17 and the magnetic disk 16, and the magnetic disk 12.

As shown in FIG. 3, the head section 17 includes a read head (often referred to as a reproducing element) 54 and a write head (often referred to as a recording element) 58, which are formed by a thin film process, on the trailing end 15b of the slider 15. The read head 54 and the write head 58 are covered with a nonmagnetic protective insulating film 53 except for the parts exposed to the ABS 13 of the slider 15. The protective insulating film 53 forms an outer shape of the head section 17. Furthermore, the head section 17 includes a light emitting element that emits light onto the surface of the magnetic disk or, in this case, a near-field light emitting element 65, a waveguide 66 that propagates laser light (beam) oscillated by the LDU 25 to the near-field light emitting element 65, a thermal resistance sensor HR that detects the surface condition (defect condition) of the magnetic disk surface, a first thermal actuator that controls the amount of protrusion of the write head 58, and a second thermal actuator that controls the amount of protrusion of the read head 54. Incidentally, the surface condition of the magnetic disk is defined as the presence or absence of defects (micro protrusions or depressions) on the surface of the magnetic disk, as well as the height and width of the micro protrusions (bumps), as described below.

The longitudinal direction (circumferential direction) of the recording track formed in the magnetic recording layer 104 of the magnetic disk 12 is defined as a track direction DT, and the width direction of the recording track that is orthogonal to the longitudinal direction is defined as a cross track direction.

The read head 54 includes a magnetic film 55 that exhibits the magnetoresistive effect, and shielding films 56 and 57 that are arranged to sandwich the magnetic film 55 on the trailing side and leading side of the magnetic film 55. The magnetic film 55 and the shielding films 56 and 57 extend substantially orthogonally to the ABS 13. Lower ends of the magnetic film 55 and the shielding films 56 and 57 are exposed to the ABS 13 of the slider 15.

The write head 58 is provided on the side of the trailing end 15b of the slider 15 with respect to the read head 54. The write head 58 includes a main magnetic pole 60 that generates a recording magnetic field orthogonal to the surface of the magnetic disk 12, a trailing yoke 62 connected to the trailing side of the main magnetic pole 60 and formed of a soft magnetic material flowing a magnetic flux to the main magnetic pole 60, a return shield magnetic pole 64 formed of a soft magnetic material that is opposed to the leading side of the main magnetic pole 60 with a write gap therebetween, a joint portion 67 that physically joins an upper part of the trailing yoke 62 to the return shield magnetic pole 64, and a recording coil 70 that is arranged to wind around a magnetic path including the trailing yoke 62 and the return shield magnetic pole 64 to flow a magnetic flux to the main magnetic pole 60.

A tip surface of the main magnetic pole 60, a tip surface of the trailing yoke 62, a tip of the near-field light emitting element 65, and a tip surface of the return shield magnetic pole 64 are exposed to the ABS 13 of the slider 15.

The main magnetic pole 60 is formed of a soft magnetic material having a high magnetic permeability and a high saturation magnetic flux density, and extends substantially orthogonally to the ABS 13. The main magnetic pole 60 has a tip surface exposed to the ABS 43, and a magnetic pole end face which extends upwardly from the ABS 13, i.e. in a direction of separating from the ABS 13 and which is opposed to the near-field light emitting element 65.

The near-field light emitting element (plasmon generator or near-field transducer) 65 is provided between the main magnetic pole 60 and the return shield magnetic pole 64, and is arranged parallel to and opposed to the magnetic pole end surface of the main magnetic pole 60 with a gap (gap length) therebetween. The end of the near-field light emitting element 65 on the ABS 13 side is formed to be parallel to and flush with the ABS 13.

The near-field light emitting element 65 is desirably formed of Au, Pd, Pt, Rh, or Ir, or an alloy consisting of a combination of some of these. An insulating layer is interposed between the main magnetic pole 60 and the near-field light emitting element 65, and this insulating layer is desirably an oxide formed of $SiO_2$, $Al_2O_3$, or the like.

The waveguide 66 extends from the ABS 13 to the back surface of the slider 42, i.e., to the end surface on the suspension side, and is optically connected to the LDU 25. The end portion (extended end portion) of the waveguide 66 on the ABS 13 side is opposed to and arranged substantially parallel to the near-field light emitting element 65 with a gap therebetween. An insulating layer is interposed between the waveguide 66 and the near-field light emitting element 65.

The first thermal actuator includes, for example, a heater 76a as a heating element. The heater 76a is embedded in the protective insulating film 53 and is located near the write head 58. The second thermal actuator includes, for example, a heater 76b as a heating element. The heater 76b is embedded in the protective insulating film 53 and is located near the read head 54.

The thermal resistance sensor HR is embedded in the protective insulation film 53 and is located between the write head 58 and the read head 54. A detection end (tip portion) of the thermal resistance sensor HR is exposed to the ABS 13 or slightly protrudes from the ABS 13. Incidentally, the thermal resistance sensor HR is used as an example of a head-disk interface (HDI) sensor.

The recording coil 70 is connected to the head amplifier IC 30 via interconnects (not shown) and the flexure 28. When signals are written to the magnetic disk 12, the recording current is supplied from the recording current supply circuit 30a of the head amplifier IC 30 to the recording coil 70, thereby exciting the main magnetic pole 60 and causing the magnetic flux to flow to the main magnetic pole 60. The recording current supplied to the recording coil 70 is controlled by the write control unit 46a of the main controller 40.

The read head 54 is connected to the head amplifier IC 30 via interconnects (not shown) and the flexure 28. The signal read by the read head 54 is amplified by the read signal amplification circuit 30d of the head amplifier IC 30 and supplied to the main controller 40.

Each of the first heater 76a and the second heater 76b is connected to the head amplifier IC 30 via interconnects and the flexure 28. By applying drive power from the heater power supply circuit 30b of the head amplifier IC 30 to the first heater 76a and the second heater 76b, the heater and the area around the heater can be heated, causing the write head 58 or the read head 54 to expand towards the magnetic disk 12 side. In other words, the flying height of the magnetic head 16 can be adjusted by adjusting the amount of expansion. The heater power supplied to the first heater 76a and the second heater 76b is controlled by the heater control unit 46c of the main controller 40.

The thermal resistance sensor HR is connected to the head amplifier IC 30 via interconnects and the flexure 28. The detection signal (sensor output) of the thermal resistance sensor HR is amplified by the sensor output amplification circuit 30c of the head amplifier IC 30 and supplied to the inspection circuit 46d of the main controller 40.

The LDU 25 is connected to the head amplifier IC 30 via interconnects (not shown) and the flexure 28. By applying the drive power from the light source drive power supply circuit 30e of the head amplifier IC 30 to the LDU 25, the LDU 25 oscillates laser light. The laser light is input to the waveguide 66 and is supplied to the near-field light emitting element 65 through the waveguide 66. The drive power supplied to the LDU 25 is controlled by the light source control unit 46g of the main controller 40.

As shown in FIG. 1, according to the HDD 10 of the above-described configuration, the head actuator 18 is rotated by driving the VCM 16, and the magnetic head 16 is moved and positioned on a desired track of the magnetic disk 12. As shown in FIG. 2, when the HDD 10 is in operation, the magnetic head 16 is opposed to the disk surface while maintaining the gap therebetween. The magnetic head 16 flies in an inclined position in which the write head 58 portion of the head section 17 is located closest to the surface of the magnetic disk 12. In this state, recorded information is read from the magnetic disk 12 by the read head 54 and information (signal) is written by the write head 58.

Figure 4:
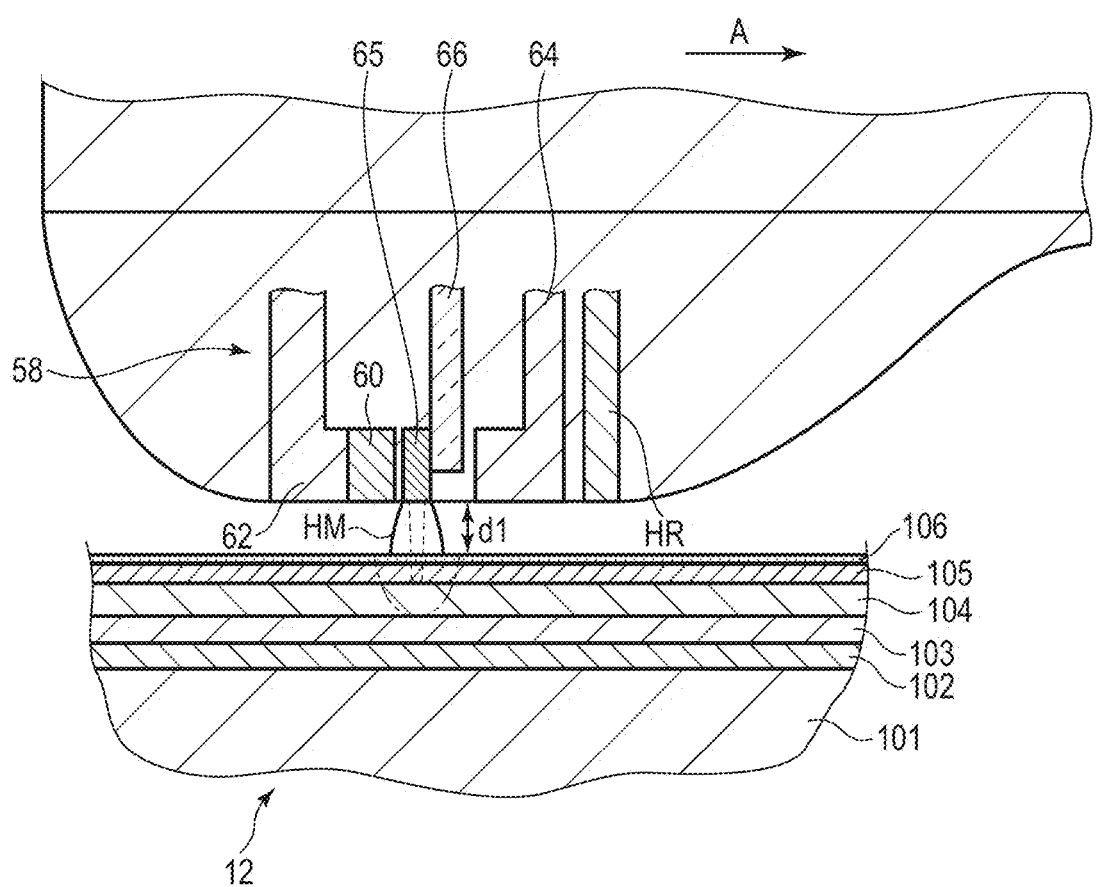
FIG. 4 is a view schematically showing the head portion of the magnetic head in which a write head portion is protruded by a thermal actuator.

FIG. 4 is a cross-sectional view schematically showing the head section 17 of the magnetic head 16 and a part of the magnetic disk 12 during the write operation.

As shown in FIG. 4, during the write operation of the magnetic head 16, the first heater 76a and its surroundings are heated and the write head 58 portion is expanded toward the magnetic disk 12 side, by applying the drive power to the first heater 76a. A gap (head flying height) d1 between the write head 58 and the surface of the magnetic disk 12 is thereby set to approximately 1 nm.

In writing information, the main pole 60 is excited by the recording coil 70, and a perpendicular recording magnetic field is applied to the magnetic recording layer 104 of the magnetic disk 12 directly below the main magnetic pole 60, thereby recording the information in a desired track width. In addition, when the information is written, in the heat assisted magnetic recording, laser light is supplied from the LDU 25 to the near-field light emitting element 65 via the waveguide 66, and near-field light is generated from the near-field light emitting element 65. The magnetic recording layer 104 of the magnetic disk 12 is locally heated by the near-field light emitted from the tip of the near-field light emitting element 65, thereby reducing the coercivity of the recording area. The recording magnetic field from the main magnetic pole 60 is applied and the recording signal is written to this area of reduced coercivity. Thus, high-density recording can be realized by locally heating the magnetic recording layer 104 portion and writing the recording signal to the area where the coercivity is sufficiently reduced.

In contrast, when the magnetic head 16 travels over the protective layer 105 at the flying height d1, the lubricant is filled between the lubricant layer 106 applied to the protective layer 105 and the tip of the near-field light emitting element 65. In this state, when the near-field light is emitted to the magnetic recording layer 104 and the lubricant layer 106, the magnetic recording layer 104 and the lubricant are locally heated, and a cured material of the lubricant is generated. By emitting the near-field light for a predetermined time, the cured material is formed in the lubricant, and the cured material HM of the lubricant having a height d1 is attached to the tip of the near-field light emitting element 65.

The main component of the cured material HM is SiOx, which is generated from the environment and the magnetic recording layer. When the cured material HM is formed, the transmission efficiency of the near-field light is improved, and the magnetic recording layer 104 can be heated with efficiency. In other words, the laser output of the LDU 25 can be reduced.

The amount of generation of the cured material HM depends on siloxanes contained in the environment and Si atoms contained in the magnetic disk 12. If the amount of Si is large, the generated cured material HM may be large. According to the HDD 10 of the embodiment, the main controller 40 monitors the time elapsed until the cured material HM is generated, and measures the correlation between the generation time and the height of the generated cured material HM. The measurement results are registered in the memory 47 as generation time data.

As described above, if there are defects such as micro protrusions (bumps) on the recording surface of the magnetic disk 12, the cured material HM attached to the magnetic head 16 may collide with the defects such as the micro protrusions and may be scraped off. Immediately after scraping, the heat conduction efficiency decreases and the recording quality is deteriorated.

Thus, the HDD 10 according to the embodiment is configured to set a record/reproduce prohibited track or a record/reproduce prohibited sector in the magnetic recording layer 104 according to the height of the bumps, set a cured material formation area having a length equivalent to the generation time required for the generation of the cured material in a part of the record/reproduce prohibited track or sector, and immediately compensate for the cured material.

An operation of detecting micro protrusions (bumps) on the surface of the magnetic disk 12 and an operation of setting the record/reproduce prohibited track or record/reproduce prohibited sector, in the HDD 10 according to the embodiment, will be described. For example, the HDD 10 executes the bump detection and the setting of the record/reproduce prohibited track and the record/reproduce prohibited sector after manufacturing, before shipment, or at regular intervals.

Figure 5:
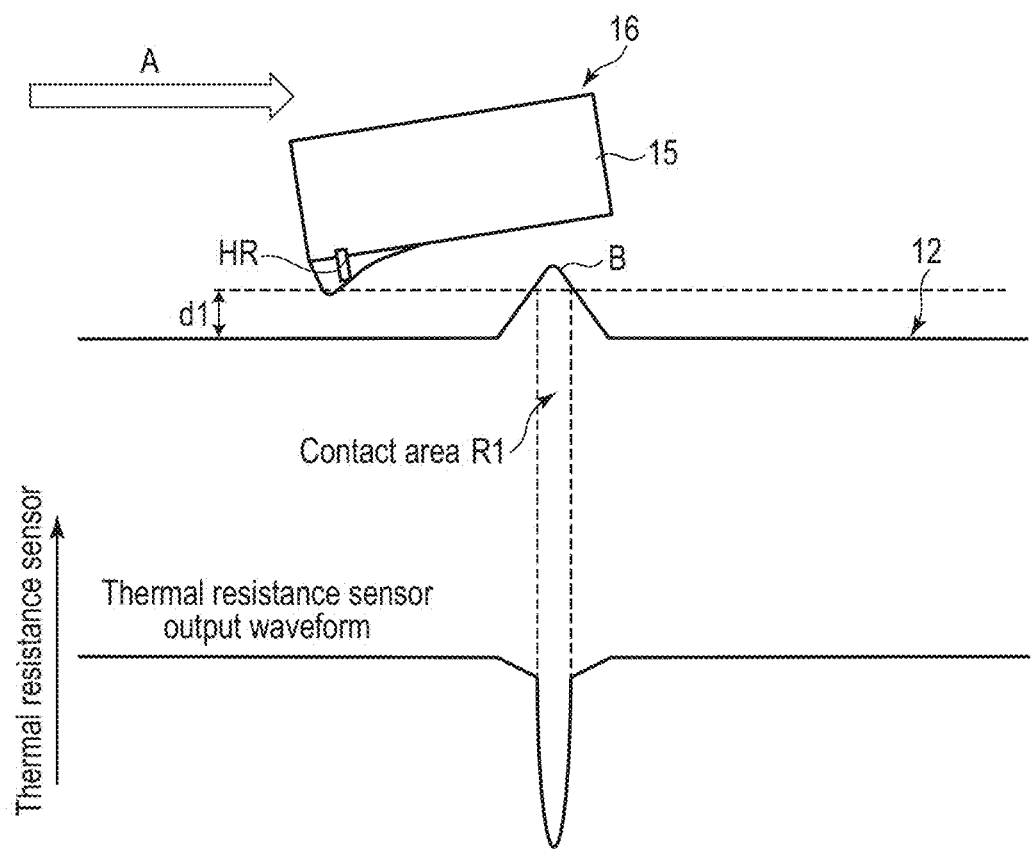
FIG. 5 is a view schematically showing an output of a thermal resistance sensor when passing over a minute protrusion (bump) on the recording medium.

FIG. 5 is a view schematically showing the output of the thermal resistance sensor when brought into contact with a micro protrusion on the recording medium.

As shown in FIG. 5, in a case where a protrusion (bump) B having a height larger than the flying height d1 of the thermal resistance sensor HR is generated on the surface of the magnetic disk 12, when the thermal resistance sensor HR passes over the bump B, a resistance value of the thermal resistance sensor HR changes, i.e., the resistance value decreases due to collision with the thermal resistance sensor HR. For this reason, an output waveform of the thermal resistance sensor HR becomes a waveform with a part corresponding to a contact area R1 falling. The width of the contact area R1 with the protrusion B, i.e., the width of the protrusion B, can be obtained from the output waveform. In addition, the height of the bump B is calculated based on the flying height d1 of the magnetic head 16 when the thermal resistance sensor HR collides with the protrusion.

Incidentally, as shown in FIG. 5, in the embodiment, the height of the protrusion (bump) B is assumed to be the height orthogonal to the surface of the magnetic disk 12, and the width of the protrusion (bump) is assumed to be the width in the track direction.

In the bump detection operation, the controller 40 scans all the tracks T1 to Tn of the magnetic disk 12 with the magnetic head 16, while successively changing the flying height of the magnetic head 16. In one example, when the flying height of the magnetic head 16 in the normal recording is assumed to be a determined value (for example, 1 nm), the bump is detected by scanning all the tracks T1 to Tn in a state in which the flying height is set to be smaller than the determined value, for example, 0.7 nm. Next, the bump is detected by scanning all the tracks T1 to Tn in a state in which the flying height of the magnetic head 16 is set to 1 nm. After that, the bump is detected by scanning all the tracks T1 to Tn while increasing the flying height of the magnetic head 16 by 0.3 nm. Then, the detection operation on the surface of the magnetic head is terminated when the flying height reaches a flying height at which no output fluctuation occurs in the thermal resistance sensor HR, i.e., when the flying height reaches a flying height at which no bumps are detected.

As shown in FIG. 1, the sensor output of the thermal resistance sensor HR is amplified by the head amplifier IC 30 and then supplied to the inspection circuit 46d of the main controller 40. The inspection circuit 46d calculates the positions (tracks and sectors) of the bumps present on the surface of the magnetic disk 12, the widths of the bumps, and the heights of the bumps, based on the sensor output of the thermal resistance sensor HR. The main controller 40 stores and registers the calculated bump data in the memory 47. In one example, the memory 47 stores a data table showing the position, height, and width of the bumps in each track.

Figure 6:
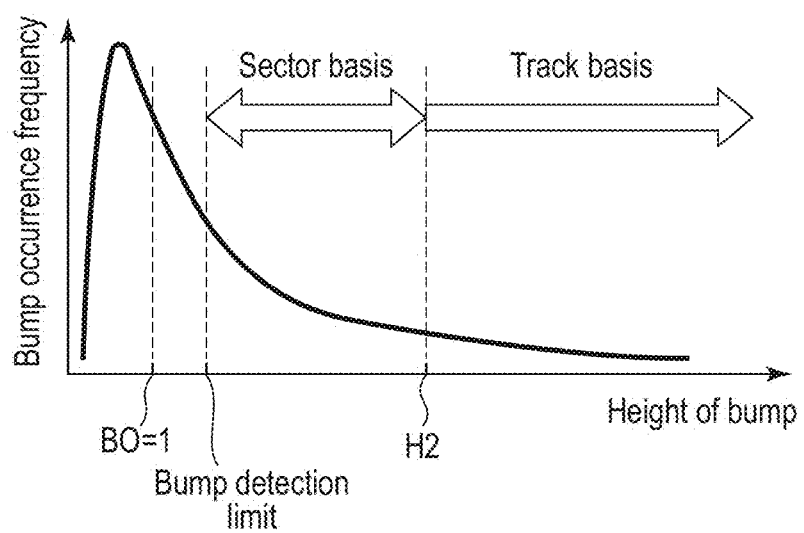
FIG. 6 is a graph showing a relationship between a bump height and a prohibited area.

FIG. 6 is a graph schematically showing a relationship among the frequency of occurrence of the bumps, the height of bumps, and the record/reproduce prohibited area. As shown in the graphs, there are a number of bumps lower than a detection limit height detected by the thermal resistance sensor HR, on the recording surface of the magnetic disk 12. In the embodiment, the main controller 40 sets a record/reproduce prohibited area on a track basis for bumps higher than a reference height H2 (in one example, approximately 5 to 6 nm), which may cause damage to the magnetic head, and sets a prohibited area for recording and playback on a sector basis for bumps higher than the detection limit but lower than the reference height H2. Since setting a record/reproduce prohibited area on a track basis results in a loss of recording capacity, the main controller 40 determines whether to set a record/reproduce prohibited area on a track basis or a sector basis depending on the height of the bump. In FIG. 6, BO (back-off)=1 indicates that the gap (head flying height) between the write head 58 and the surface of the magnetic disk 12 is 1 nm when the write head 58 portion is expanded toward the magnetic disk 12 by the first heater 76*a*.

Figure 7:
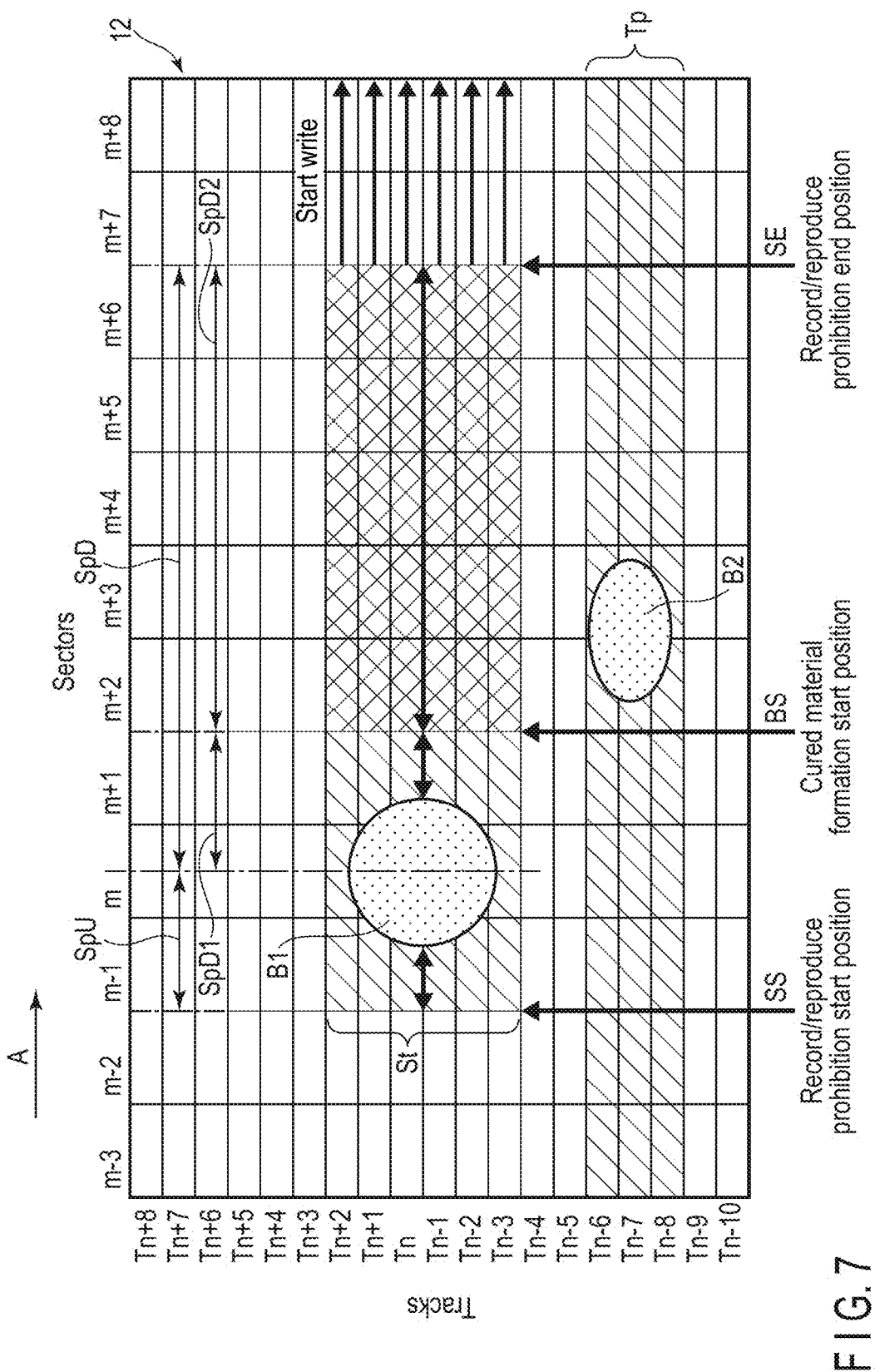
FIG. 7 is a plan view schematically showing the bumps on the recording surface, and record/reproduce prohibited tracks and record/reproduce prohibited sectors.

FIG. 7 is a plan view schematically showing the bumps on the recording surface, and the record/reproduce prohibited tracks and the record/reproduce prohibited sectors.

The determination circuit 46*e* of the MPU 46 determines the height of the bump B on each of the tracks T1 to Tn, based on the bump data registered in the memory 47, and determines whether to set the record/reproduce prohibited area on a track basis or a sector basis according to the height of the bump B.

The area setting circuit 46*f* of the MPU 46 sets the number of record/reproduce prohibited tracks Tp corresponding to the height of the bump B or sets the number of record/reproduce prohibited sectors Sp corresponding to the height of the bump B, based on the determination results of the determination circuit 46*e*, and registers them in the memory 47.

In one example, as shown in FIG. 7, the area setting circuit 46*f* sets three tracks including bump B2 as the record/reproduce prohibited tracks Tp, for the bump B2 determined to be a bump for which the record/reproduce prohibited area is set on a track basis, and registers the tracks in the memory 47. A total of three record/reproduce prohibited tracks Tp are set, including one track on the inner side and one track on the outer side centered on the track where the bump B2 exists.

The area setting circuit 46*f* sets the record/reproduce prohibited sectors Sp on the upstream and downstream sides of bump B1, on six tracks including the bump B1, for the bump B1 determined to be a bump for which the record/reproduce prohibited area is set on a track basis, and registers the sector in the memory 47.

More specifically, a record/reproduce prohibited sector Sp of a total of six tracks are set, including three tracks on the inner side and three tracks on the outer side, centered on the tracks and sectors where the bump B1 exists. For magnetic head travel direction A, an upstream side record/reproduce prohibited sector SpU for one sector is set on the upstream side of the bump B1. A downstream side record/reproduce prohibited sector SpD is set on the downstream side of the bump B1.

The downstream side record/reproduce prohibited sector SpD is longer in track direction than the upstream record/reproduce prohibited sector SpU, i.e. includes more sectors. The downstream side record/reproduce prohibited sector SpD includes a record/reproduce prohibited area SpD1 for one sector on the downstream side of the bump B1. Furthermore, the downstream side record/reproduce prohibited sector SpD includes a cured material formation area (cured material formation sector) SpD2 for a plurality of sectors following the downstream side of the record/reproduce prohibited area SpD1 or, in one example, five sectors.

Incidentally, the number of sectors set in the upstream side record/reproduce prohibited sector SpU and the record/reproduce prohibited area SpD1 is not limited to the above-described example, but can be increased as needed. The number of record/reproduce prohibited sectors may be determined according to the height of the bump B1, and the number of record/reproduce prohibited sectors may be set to be increased as the height of the bump is larger.

In addition, in the embodiment, the cured material formation area SpD2 for six tracks is set to the same length (five sectors). The length (number of sectors) of the cured material formation area SpD2 can be increased or decreased in accordance with the height of the bump B1 and the cured material HM generation time data, which are registered in the memory 47. In other words, the removed cured material is increased as the bump B1 is higher, and the cured material formation area SpD2 is set to be long.

When the HDD 10 is in operation, the main controller 40 executes data recording operations for other recording tracks T excluding the record/reproduce prohibited tracks Tp registered in the memory 47. After the setting, the main controller 40 prohibits the record/reproduce operations on the record/reproduce prohibited tracks Tp, i.e., prohibits the magnetic head 16 from accessing the record/reproduce prohibited tracks Tp.

The main controller 40 executes the following data recording operations on the recording track on which record/reproduce prohibited sectors St are set.

Figure 8:
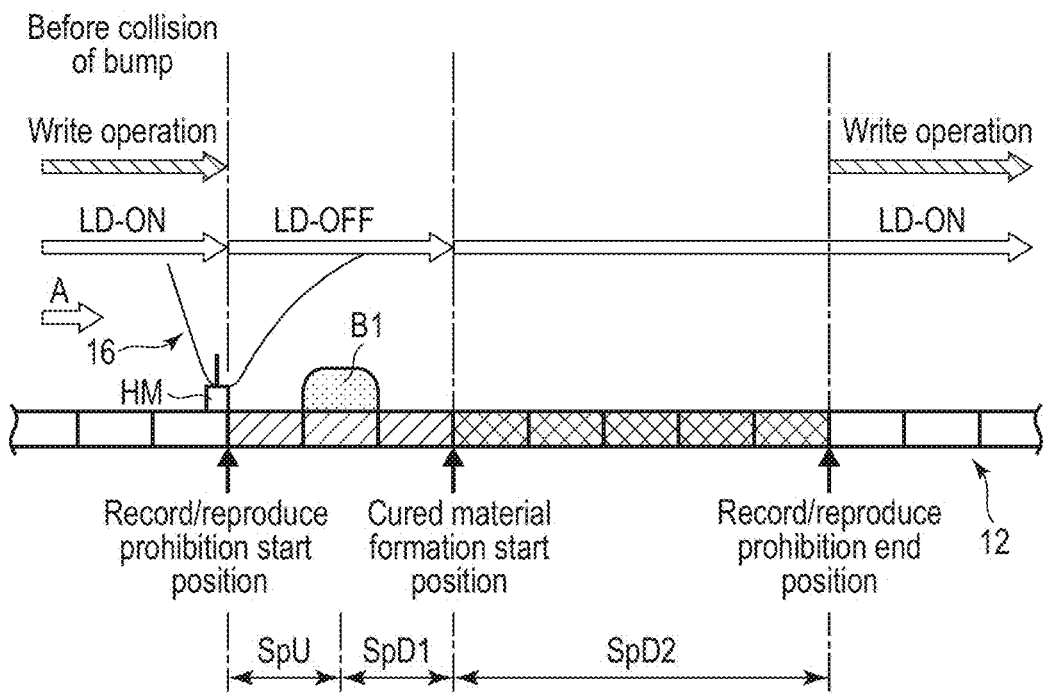
FIG. 8 is a view schematically showing the head portion, the bump, and the record/reproduce prohibited sector before bump collision.
Figure 9:
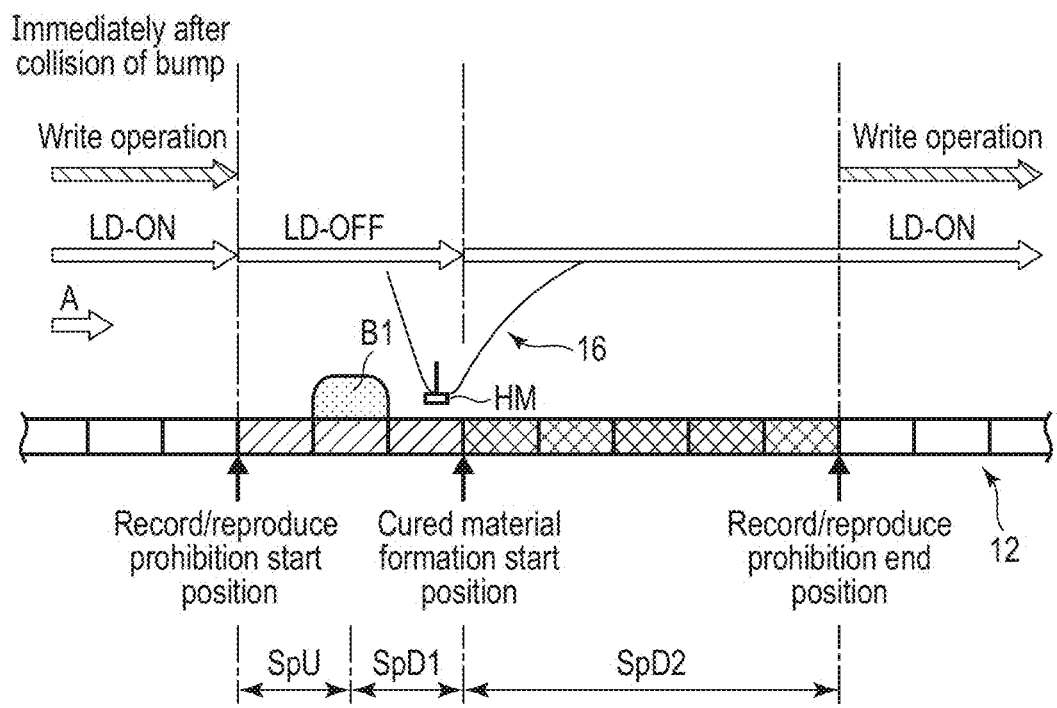
FIG. 9 is a view schematically showing the head portion, the bump, and the record/reproduce prohibited sector immediately after bump collision.
Figure 10:
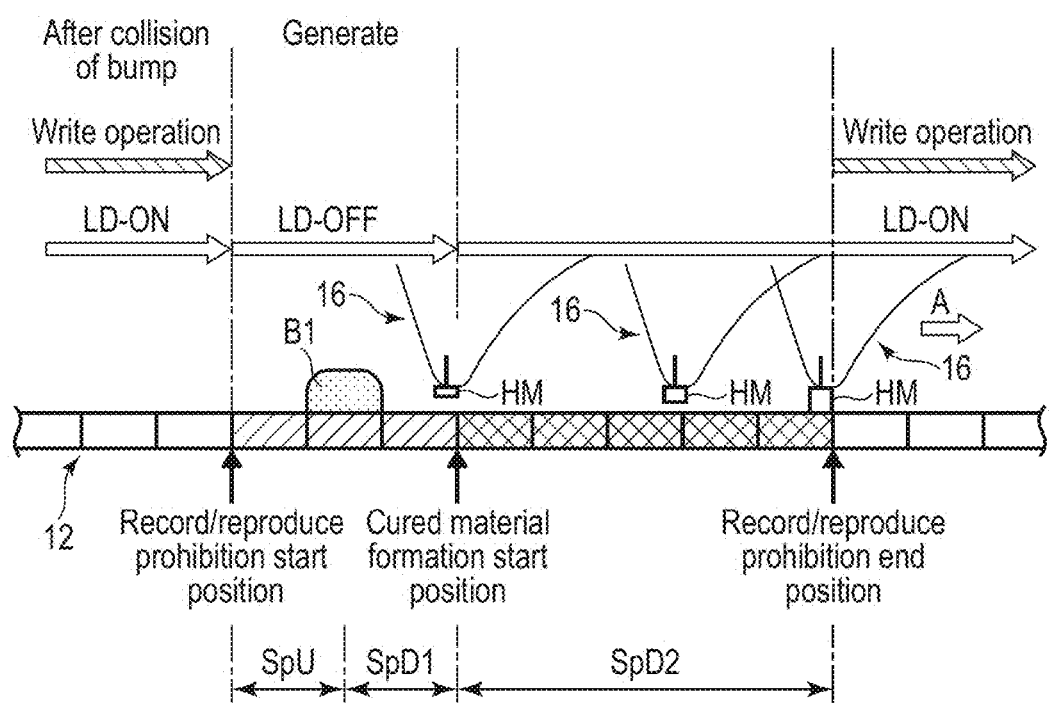
FIG. 10 is a view schematically showing the head portion, the bump, and the record/reproduce prohibited sector during generation of a cured material.

FIG. 8, FIG. 9, and FIG. 10 are views schematically showing the write operation of the magnetic head and the cured material formation operation when passing through the record/reproduce prohibited sectors St.

As shown in FIG. 8, before the magnetic head 16 collides with the bump B1, the main controller 40 supplies a recording current to the magnetic head 16, and turns on the LDU 25 to emit the near-field light onto the recording layer of the magnetic disk 12 until the magnetic head 16 reaches a start position SS of the upstream recording/playback prohibited sectors SpU. It is assumed that at this time, the magnetic head 16 flies at a predetermined flying amount d1, for example, approximately 1 nm, and that the cured material HM is formed between a light emitting element 65 of the magnetic head and the recording surface of the magnetic disk 12.

When the magnetic head 16 reaches the upstream end of the upstream side record/reproduce prohibited sectors SpU, i.e., a record/reproduce prohibition start position SS, the main controller 40 stops the write operation and sets the power of the LDU 25 to off, i.e., stops the emission of the near-field light.

As shown in FIG. 9, when the magnetic head 16 passes over the bump B1, the cured material HM attached to the light emitting element collides with the bump B1. As a result, the cured material HM is partially scraped off and becomes a cured material which is low in height.

As shown in FIG. 10, when the magnetic head 16 reaches the end of the downstream side record/reproduce prohibited area SpD1, i.e., a start position BS of the cured material formation area SpD2, the main controller 40 turns on the power of the LDU 25 and emits the near-field light from the light emitting element onto the recording surface of the magnetic disk 12. The main controller 40 keeps the LDU 25 turned on until the magnetic head 16 reaches a record/reproduce prohibition end position SE that is the end of the cured material formation area SpD2. As a result, the cured material HM is gradually formed at the tip of the light emitting element, and the cured material HM has grown to a height substantially equal to the flying height d1 of the magnetic head 16 at the time when the magnetic head 16 reaches a record/reproduce prohibition end position SE.

After the magnetic head 16 has reached the record/reproduce prohibition end position SE, the main controller 40 starts the write operation by supplying a recording current to the magnetic head 16. At the same time, the main controller 40 turns on the LDU 25 and drives the LDU 25 at a predetermined output to emit the near-field light onto the recording layer of the magnetic disk 12. At this time, since the hardening material HM is sufficiently attached to the tip of the light-emitting element, the transmission efficiency of the near-field light is improved, the magnetic recording layer 104 of the magnetic disk 12 can be heated with efficiency.

As described above, the length (number of sectors) of the cured material formation area SpD2 in the record/reproduce prohibited sectors Sp is set based on the height of the bump B1 (the amount of cured material that is scraped off by the bump B1) and the generation time data registered in the memory 47, and is set to the length in which the cured material HM scraped off by the bump B1 is generated to the predetermined height d1.

The output of the LDU 25 can be set as desired during the formation of the cured material, i.e., while the magnetic disk passes through the cured material formation area SpD2. The output of the LDU 25 during the formation of the cured material may be the same as or different from the output of the LDU 25 during the write operation. If the output of the LDU 25 during the formation of the cured material is higher than the output during the normal write operation, the time to generate the cured material can be shortened, but the damage to the magnetic disk 12 and the LDU 25 may be greater accordingly. Therefore, it is desirable to adjust the output of the LDU 25 by considering the balance between the generation time and the damage. An output change switch which can be selected by the user or the like may be provided in the light source control unit 46g.

According to the HDD of the first embodiment configured as described above, the record/reproduce prohibited areas are provided on the upstream and downstream sides of the bumps on the recording surface and, furthermore, the cured material formation area is provided in the record/reproduce prohibited area on the downstream side. Thus, even if the cured material passes through the bumps and is scraped off, the cured material can be immediately formed while the magnetic head is passing through the cured material formation area, and the tip of the light emitting element of the magnetic head can be filled with the cured material having a sufficient height. Therefore, the magnetic recording layer of the magnetic disk can be heated with high thermal conductivity efficiency immediately after passing through the bumps.

Based on the above, according to the first embodiment, a magnetic recording device capable of suppressing the degradation of the recording quality due to defects on the recording medium and improving the recording density, can be obtained.

Next, an HDD according to another embodiment will be described. In another embodiment described below, the same portions as those of the above-described first embodiment will be denoted by the same reference numbers, their detailed description will be omitted or simplified, and only portions different from the first embodiment will be mainly described in detail.

Second Embodiment

Figure 11:
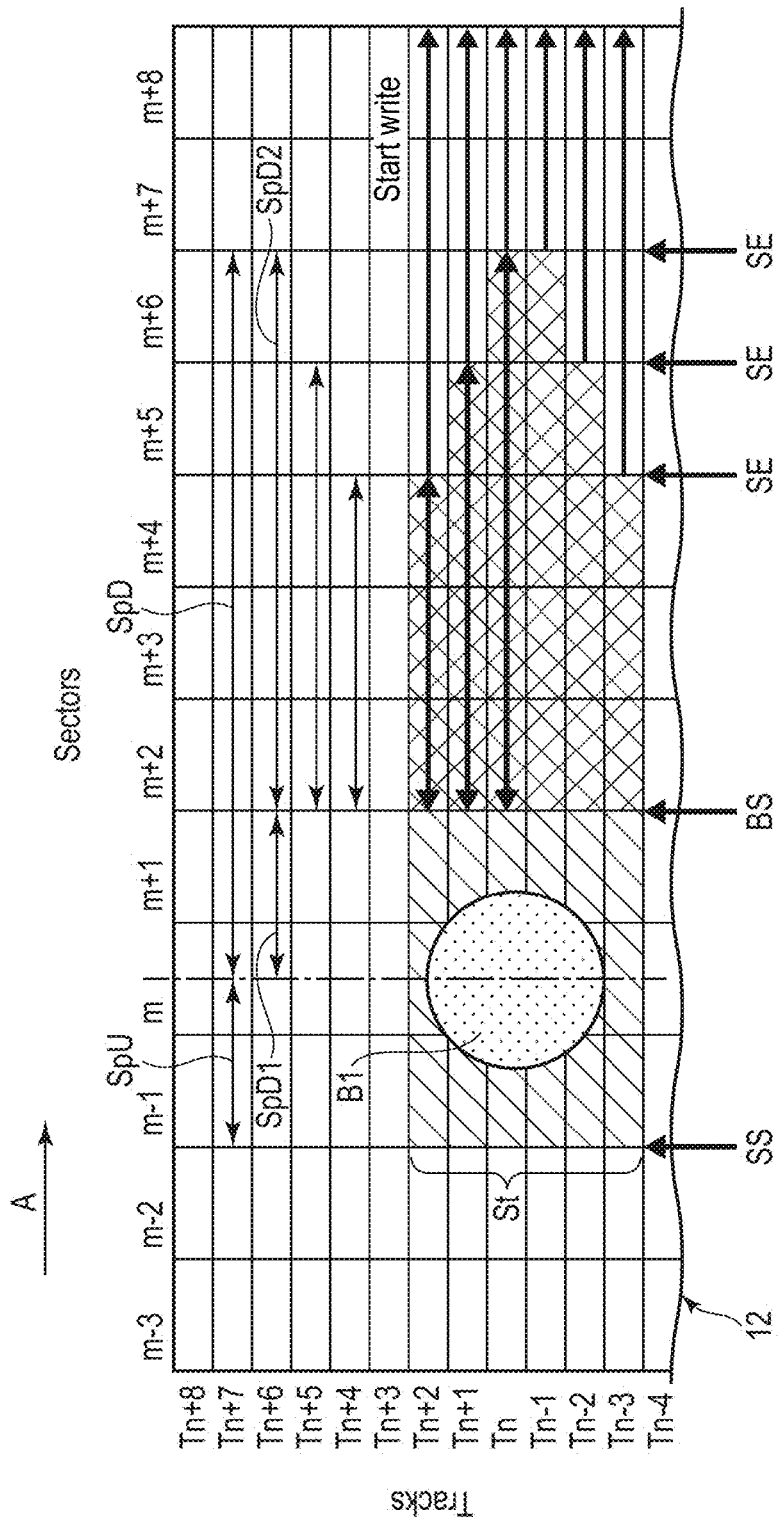
FIG. 11 is a plan view schematically showing a bump on a recording surface, and record/reproduce prohibited sectors, on HDD according to a second embodiment.

FIG. 11 is a plan view schematically showing a bump on a recording surface, and record/reproduce prohibited sectors, on HDD according to a second embodiment.

The degree of scrape of the cured material HM attached to a light emitting element in a case where the cured material collides with the bump depends on a height of the bump. Therefore, in the second embodiment, heights of the bumps which occur on the recording surface of the magnetic disk are inspected and registered in advance, and a length (number of sectors) of a cured material formation area SpD2 in the record/reproduce prohibited sectors St is determined according to the height of each bump.

Even for the same bump, the degree of scrape may change depending on a location where the magnetic head passes. In other words, even for the same bump, the height may change depending on the location.

As shown in FIG. 11, according to the second embodiment, the length (number of sectors) of the cured material formation area SpD2 is changed according to the height of the bump B in the record/reproduce prohibited sectors St. In the example shown in the figure, the height of the bump B is high in the center and low at both ends in the track width direction. Therefore, the cured material formation area SpD2 is set to be long, for example, 5 sectors, for the recording track that passes through the center of the bump B, and the cured material formation area SpD2 is set to be short, for example, 4 sectors or 3 sectors, for the recording tracks that pass through both ends of the bump B.

Figure 12:
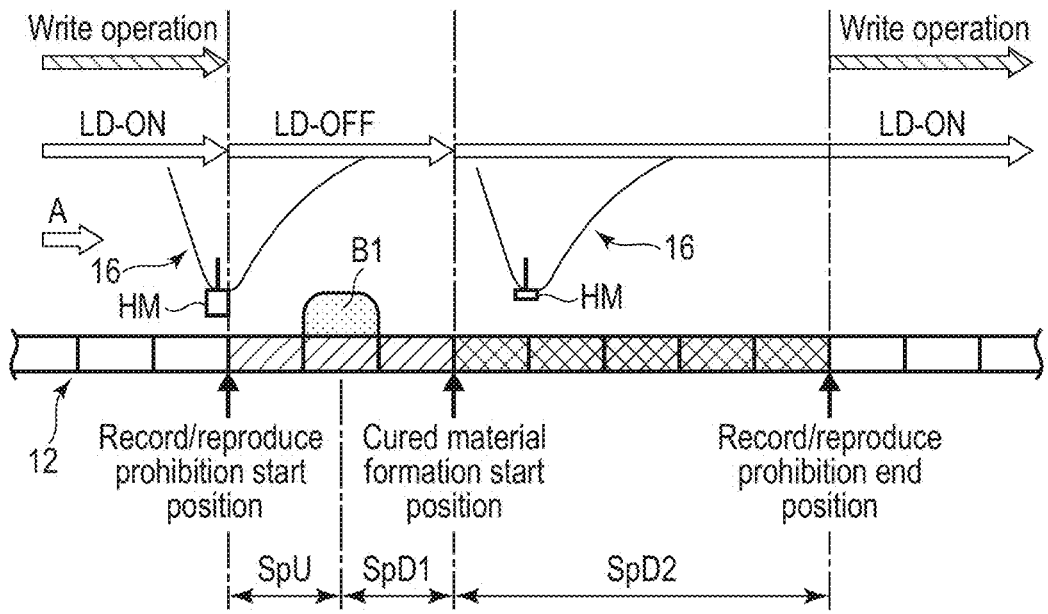
FIG. 12 is a view schematically showing the head portion, the bump, and the record/reproduce prohibited sectors when the bump is high, on the HDD according to the second embodiment.
Figure 13:
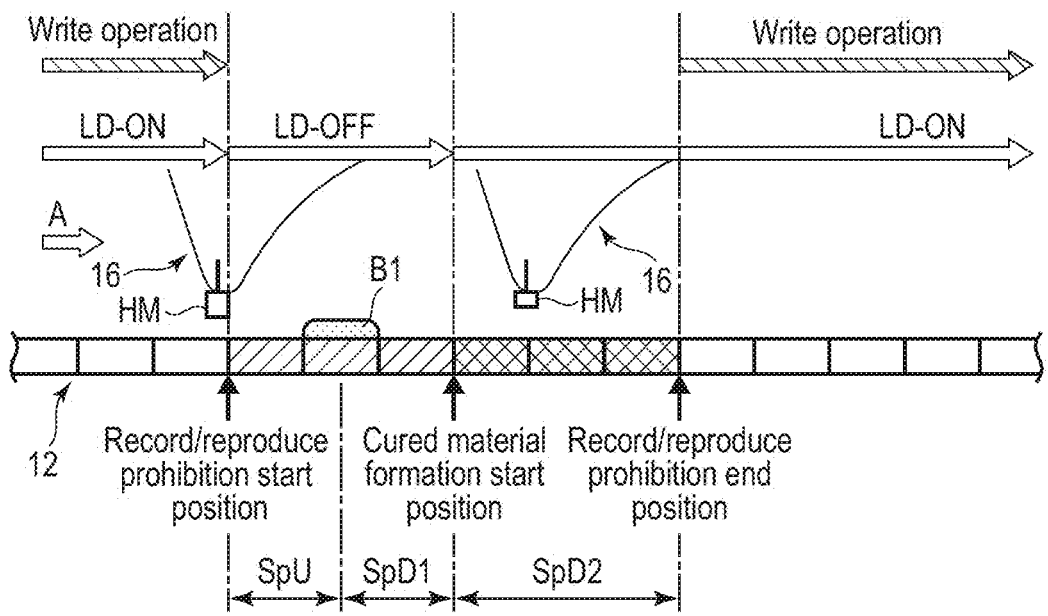
FIG. 13 is a view schematically showing the head portion, the bump, and the record/reproduce prohibited sectors when the bump is low, on the HDD according to the second embodiment.

FIG. 12 is a view schematically showing a write operation of the magnetic head and a cured material formation operation when passing through the record/reproduce prohibited sectors St located in the center of the bump B. FIG. 13 is a view schematically showing a write operation of the magnetic head and a cured material formation operation when passing through the record/reproduce prohibited sectors St located at the end portions of the bump B.

As shown in FIG. 12, when the magnetic head passes through the center of the bump B, i.e., the part with a higher height, the magnetic head's cured material HM collides with the bump B and most of it is scraped off. In this case, too, since the cured material formation area SpD2 is set to be long, the cured material is sufficiently embedded and the cured material of a predetermined height is generated while the magnetic head passes through the cured material formation area SpD2.

As shown in FIG. 13, when the magnetic head passes through the end portions of the bump B, i.e., the portion of a small height, the amount of scraping of the cured material HM is relatively small, and approximately half of the cured material HM is maintained. Therefore, even when the cured material formation area SpD2 is set to a short length, the cured material can be generated to a predetermined height while the magnetic head passes through the cured material formation area SpD2.

According to the HDD of the second embodiment configured as described above, the same advantages as those of the HDD of the first embodiment can be obtained. In other words, according to the HDD of the second embodiment, a magnetic recording device capable of suppressing the degradation of the recording quality due to defects on the recording medium and improving the recording density, can be obtained.

Furthermore, according to the second embodiment, the sectors in the recording area can be increased and the recording capacity can also be increased by setting the length of the cured material formation area according to the height of the bump, for example, by setting the length of the cured material formation area to be shorter for the bumps of a small height.

Incidentally, in the second embodiment, the bumps and the cured material formation area are not limited to those in the example shown in FIG. 11, but can be variously changed according to the shape of the bumps. For example, there are various types of bumps such as a bump which is high at one end and low at the other end and a bump which is high at both ends and low in the center, but the length of the cured material formation area can be set to be longer or shorter depending on the height of each part of the bump.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the number of the record/reproduce prohibited sectors and the number of the cured material formation areas, which are set according to the height of the bumps, are not limited to those in the above-described embodiments, but can be increased or decreased as needed. The above-described embodiments can also be applied to HDD of shingled magnetic recording.

The material, shape, size, and the like of the elements constituting the head section of the magnetic head can be changed as needed. The number of magnetic disks and the number of magnetic heads in the magnetic recording device can be increased or decreased as needed. The size of the magnetic disks can be variously selected.

What is claimed is:

1. A magnetic recording device comprising:
a disk-shaped recording medium;
a magnetic head including a recording element, a light source, a light emitting element emitting light onto a recording surface of the recording medium, and a sensor which detects a defect on the recording surface of the recording medium; and
a controller including an inspection circuit which detects a height of the defect on the recording surface of the recording medium based on output of the sensor, a memory which stores the detected height of the defect, a setting circuit which sets an upstream side record/reproduce prohibited sector on an upstream side of the defect, in a travel direction of the magnetic head, on a track of the recording medium on which the defect is present, and which sets a downstream side record/reproduce prohibited sector longer in track direction than the upstream side record/reproduce prohibited sector on a downstream side of the defect, and a light source control circuit controlling output of the light source.

2. The magnetic recording device of claim 1, wherein the downstream side record/reproduce prohibited sector includes a record/reproduce prohibited area following a downstream side of the defect, and a cured material formation sector provided from the record/reproduce prohibited sector to an end of the downstream side record/reproduce prohibited sector.

3. The magnetic recording device of claim 2, wherein the controller comprises a write control unit prohibiting a write operation of the recording element in the upstream side record/reproduce prohibited sector and the downstream side record/reproduce prohibited sector, and
the light source control circuit stops output of the light source in the upstream side record/reproduce prohibited sector and the downstream side record/reproduce prohibited area, and outputs light from the light source in the cured material formation sector.

4. The magnetic recording device of claim 2, wherein the setting circuit sets a length on a track direction of the cured material formation area in accordance with a height of the defect.

5. The magnetic recording device of claim 1, wherein the setting circuit sets a plurality of record/reproduce prohibited tracks for a defect having a height larger than a reference height, on a recording surface of the recording medium, and sets the upstream side record/reproduce prohibited sector and the downstream side record/reproduce prohibited sector for a defect having a height smaller than the reference height.

* * * * *